United States Patent Office 2,806,370
Patented Sept. 17, 1957

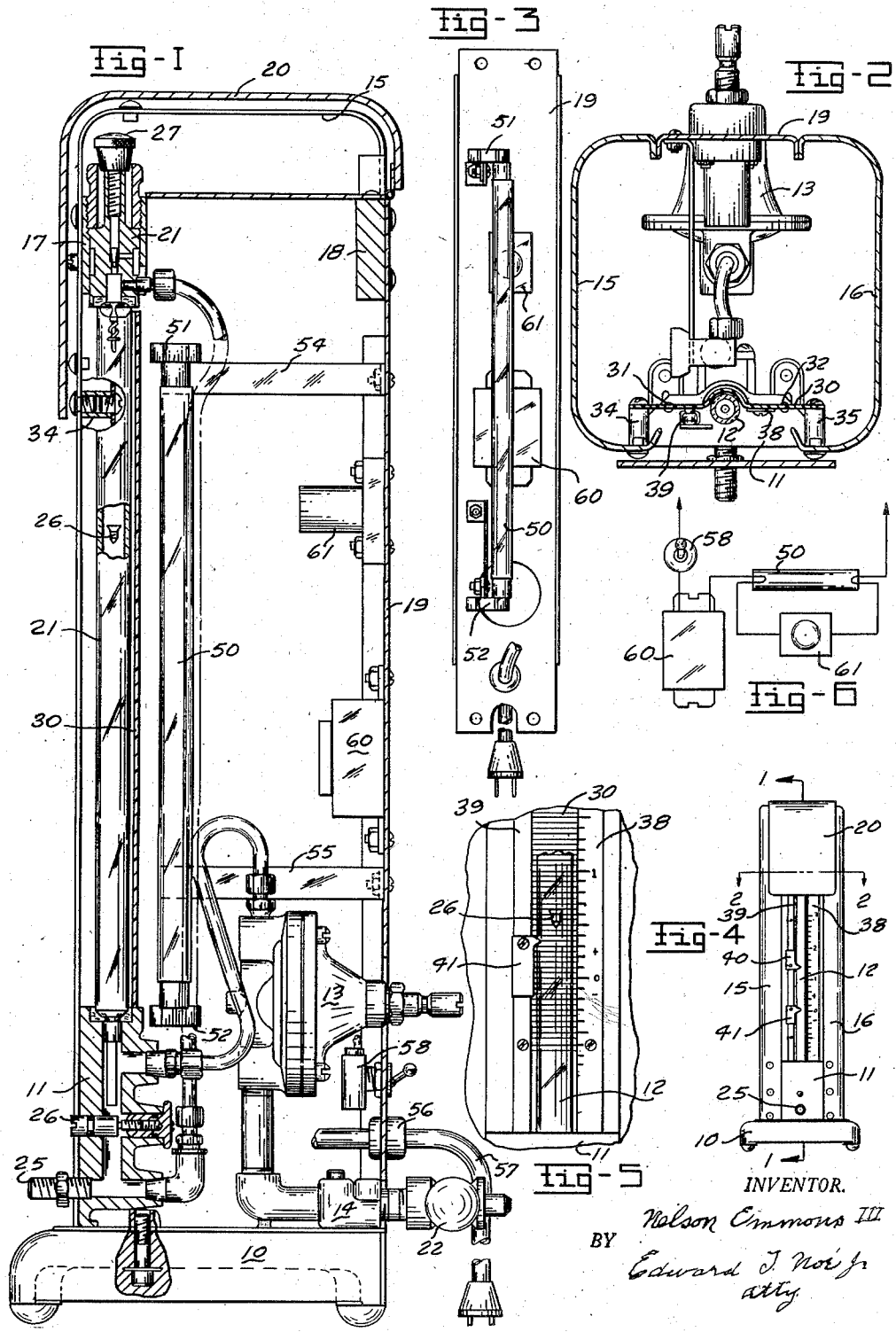

2,806,370

PNEUMATIC GAUGING DEVICE

Nelson Emmons III, Dayton, Ohio, assignor, by mesne assignments, to The Sheffield Corporation, a corporation of Delaware Application March 30, 1954, Serial No. 419,773

7 Claims. (Cl. 73—37.5)

This invention relates to precision air flow gauging instruments for use in gauging systems responsive to air flow as controlled by a characteristic of a product being gauged.

In one type of gauging instrument employed in such systems an indicating float is positioned along an internally tapered flow tube in accordance with the velocity of air flow up the tube as determined by a product dimension, product permeability, or the like. A suitably calibrated metal scale is provided along the flow tube and the position of the float along the tube gives an indication of the product characteristic being gauged.

In high precision gauging operations it is important that the operator be able to readily determine, without parallax, the precise position of the float along the associated scale through repeated gauging operations over long periods. In the various conditions of light and shadow common to installations where such instruments are employed such precise determination is often possible only by a time consuming examination of the float position and with undue strain to the operator's eyes. Where an operator is making repeated checks throughout an entire work day such factors become extremely important and make efficient precision gauging more difficult.

It is accordingly an object of this invention to provide such a gauging instrument for use in precision gauging wherein gauging indications are quickly and precisely apparent regardless of surrounding conditions of illumination.

It is a further object to provide such an instrument wherein a translucent scale strip is supported behind the flow tube and between the flow tube and a tubular light source, such as a fluorescent tube or the like, whereby the indicating float appears silhouetted and its precise position along the illuminated scale is readily determined with precision.

It is a further object to provide such an instrument wherein opaque calibrations are provided along the translucent strip behind the flow tube in the instrument cabinet whereby the float and opaque calibrations appear to the operator in superimposed, silhouetted relationship with the result that precise readings are obtained regardless of light conditions surrounding the instrument.

It is a further object to provide such an instrument wherein all electrical components including the tubular light source and a controlling switch are supported on a single supporting plate which is readily removed from or mounted in the instrument for repair or replacement of electrical components and for ready adaptation of existing instruments to include the features of this invention.

Other objects and advantages of the invention will be apparent from the following description, the appended claims and the accompanying drawing.

In the drawing, in which the same reference characters have been applied to like parts in the several views;

Figure 1 is a vertical central section of a gauging instrument embodying the present invention, taken on line 1—1 of Figure 4, Figure 2 is a horizontal section of the instrument taken on line 2—2 of Figure 4, Figure 3 illustrates an instrument back plate which supports the removable electrical components, Figure 4 is a front view of the gauging instrument, Figure 5 is an enlarged fragment of the lower front portion of the instrument showing the association of the flow tube, float, and the scribed translucent plate, and Figure 6 is a diagrammatic representation of the electrical circuit and electrical components.

The instrument illustrated for the purpose of disclosing the features of this invention is one wherein air under controlled pressure is supplied to the lower end of a vertically disposed transparent flow tube having an internal taper and flows up through the tube and to a gauge head where the flow is controlled in accordance with a product characteristic. An opaque float is positioned along the length of the flow tube in accordance with the velocity of air flow upward through the tube and the product characteristic being gauged. In view of the highly precise character of the gauging operation possible with such an instrument, the present invention provides a source of illumination whereby the relative position of the float along the instrument calibrations is readily apparent with precision and without undue strain to the operator's eyes, particularly over prolonged periods of repeated gauging operations. In the specific illustrated apparatus a translucent plastic plate is suspended behind and around a portion of the transparent flow tube and a tubular light source is mounted parallel to the flow tube and behind the plastic plate. With such a structure the opaque float appears in silhouetted relationship along the illuminated plastic strip and its precise disposition along the instrument calibrations can be readily and precisely determined.

The instrument comprises a base 10 upon which a mounting block 11 for the tube 12 and a support 14 for the regulator 13 are mounted. Two vertically disposed sheet metal side panels 15 and 16 are fixed at their lower end to the mounting block 11 and the regulator support 14. At their upper ends the side panels 15 and 16 are tied together by an upper mounting block 17 and a tie bar 18. A back panel 19 extending between the regulator support 14 and the tie bar 18, and a hinged cover plate 20 complete the housing assembly. The transparent flow tube 12 is seated in the lower mounting block 11 and is clamped by a clamping member 21 carried in the upper mounting block 17.

Air is supplied for gauging through an adjustable valve 22, a regulator 13, and to the lower end of flow tube 12. After its passage upward through the flow tube 12 air is led through a connection 25 at the lower front face of the instrument to a suitable gauge head where the flow is controlled in accordance with the particular product characteristic being gauged. A float 26 is positioned along the flow tube 12 and its association with the instrument calibrations indicates the product dimension or the like. An amplification adjustment is provided at 26 in a bypass from the air supply directly to the gauge head connection 25, and a float positioning adjustment is provided at 27 to bleed air directly to atmosphere after its passage through the flow tube 12 for positioning the float 26 as desired along the length of the flow tube 12 in setup.

A translucent plastic plate or strip 30 extends around a portion of the flow tube 12 and to each side thereof. This plate 30 is supported at its lower end in a pair of notched pins 31 and 32 in the upper surface of the lower mounting block 11 and extends upward to where its upper end is supported by a pair of sleeves 34 and 35 from the side plates 15 and 16. The particular plastic plate 30 illustrated has vertically spaced horizontal opaque calibrations extending behind the transparent flow tube 12 as particularly seen in Figure 5 and supports a calibrated plate or strip 38 at one side of the flow tube 12 and a strip 39 which carries movable indicators 40 and 41 at the other side of the flow tube.

An elongated source of illumination such as a fluorescent tube 50 extends behind the plastic plate 30 and along the effective measuring length of the flow tube 12. Illumination from the light tube 50 will silhouette the indicating float 26 relative to the opaque calibrations on the plastic plate 30 and with respect to the calibrations along the strip 38 in diffused illumination. The flat upper surface of the indicating float 26 is the indicating reference and the ease with which its position along the calibrations of plastic plate 30 can be discerned will be apparent from Figure 5.

The importance of precise and rapid reading of the instrument indication without undue strain to the operator will be apparent in view of the high precision possible in gauging with such instruments and the fact that in gauging mass produced parts repeated gauging operations must be continued over prolonged periods. For example the particular instrument illustrated is calibrated for dimension measurements and has an effective amplification of 2000 to 1 and an accurate indicating range of .0038 of an inch. This means that each minor calibration along strip 38 corresponds to .0001 of an inch of a gauged product dimension and each calibration on the plastic plate 30 represents .000050 of an inch of the product dimension. Instruments of even higher amplification and precision in gauging are also available. The present invention makes possible the rapid reading with precision and without strain of such high precision gauging instruments.

The light tube 50 is supported between upper socket 51 and lower socket 52 mounted by brackets 54 and 55 respectively from the back panel 19. All other electrical components including a support 56 for the electrical connection 57, switch unit 58, ballast 60 and starter 61 are also supported from panel 19. The adjustment for the regulator 13 extends through an opening in the panel 19. Thus by simply detaching the back panel 19 from the tie bar 18 and the regulator support 14 the entire electrical assembly can be simply removed from the instrument for repair or replacement of components. Existing instruments of this type can be readily adapted to utilize the features of this invention by replacing metallic plates with the translucent plate 30 of this invention and substituting such an electrical assembly for the back panel of the instrument.

It will be noted that the lower bracket 55 extends forward and then downward to support the lower end of the light tube 50 adjacent the lower end of the flow tube 12 between the plastic panel 30 and the regulator 13. The complete electrical circuit is shown in detail and diagrammatically in Figure 6.

Because of the illumination provided by the structure of this invention and its unique association with the indicating float, the transparent flow tube, and the instrument calibrations, prolonged gauging operations of a highly precise nature can be performed rapidly and without strain to the operator's eyes. With the relationship of the flow tube, the opaque float, the scribed plastic plate 30 and the light tube 50 wherein the float 26 appears in silhouetted relationship upon the plate calibrations, precise readings can be made because the disposition of the indicating float is readily apparent and without parallax. Through the mounting of all the electrical components on a single housing member the system can be readily removed for repair and existing instruments of this character can be easily adapted for more precise and rapid gauging operation by utilizing the features of this invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A precision gauging instrument for use in determining product characteristics by measuring air flow through a gauging head, said instrument comprising: a vertically disposed transparent flow tube having an internal passage tapering towards the lower end of the tube, means connected to the lower end of said tube adapted for connection to a source of air under controlled pressure, means connected to the upper end of said tube and adapted for connection to a gauging head, an indicating float arranged for movement along the passage of the transparent flow tube responsive to the velocity of air flow up the flow tube, a tubular light source having a length commensurate with that of the flow tube and extending vertically therealong, means extending along the flow tube having vertically spaced calibration lines thereon, said means providing a translucent portion curved about and extending along and to each side of the rearward portion of the tube generally concentric therewith and a portion along the tube extending generally radially thereof, the translucent portion extending between the light source and the flow tube; the flow tube, the translucent portion, and the tubular light source being relatively spaced in that order away from the observer whereby direct illumination from said light source is diffused and illuminates the flow tube without strain on the observer's eyes; and means supporting the instrument components and including a housing wall having an opening along its forward face through which the flow tube and float are visible.

2. A precision gauging instrument for use in determining product characteristics by measuring air flow through a gauging head, said instrument comprising: a vertically disposed transparent flow tube having an internal passage tapering towards the lower end of the tube, means connected to the lower end of said tube adapted for connection to a source of air under controlled pressure, means connected to the upper end of said tube and adapted for connection to a gauging head, an indicating float arranged for movement along the passage of the transparent flow tube responsive to the velocity of air flow up the flow tube, an elongated scale strip having a translucent semi-cylindrical portion with vertically spaced calibration lines thereon, a tubular light source having a length commensurate with that of the flow tube and extending vertically therealong, the semi-cylindrical portion of said strip extending closely adjacent and along the rearward portion of said flow tube directly between the flow tube and tubular light source; the flow tube, the central portion of the scale strip, and the tubular light source being relatively spaced in that order away from the observer whereby direct illumination from said light source is diffused and illuminates the flow tube without strain on the observer's eyes; and means supporting the instrument components and including a housing wall having an opening along the forward face thereof through which the flow tube, float and scale strip are visible.

3. A precision gauging instrument for use in determining product characteristics by measuring air flow through a gauging head, said instrument comprising: a vertically disposed transparent flow tube having an internal passage tapering towards the lower end of the tube, means connected to the lower end of said tube adapted for connection to a source of air under controlled pressure, means connected to the upper end of said tube and adapted for connection to a gauging head, an indicating float arranged for movement along the passage of the transparent flow tube responsive to the velocity of air flow up the flow tube, an elongated plastic plate having a translucent semi-cylindrical central portion and outwardly projecting flanges therealong, means supporting said plastic plate with the semi-cylindrical portion thereof extending closely adjacent along and behind said flow tube with the flanges of the plate lying substantially in a diametral plane of the flow tube, an elongated light source having a length commensurate with the effective measuring length of said flow tube and extending therealong directly behind the semi-cylindrical portion of said plastic plate, an elongated scale strip, means mounting said scale strip on one of the plate flanges in a diametral plane of the flow tube and with the edge of the strip closely adjacent the flow tube; the flow tube, the central portion of the plastic plate, and the elongated light source being relatively spaced in that order away from the observer whereby direct illumination from said light source is diffused and illuminates the flow tube without strain on the observer's eyes; and means supporting the instrument components and including a housing wall having an opening along the forward face thereof through which the flow tube, float and plastic plate are visible.

4. A precision gauging instrument for use in determining product characteristics by measuring air flow through a gauging head, said instrument comprising: a vertically disposed transparent flow tube having an internal passage tapering towards the lower end of the tube, means connected to the lower end of said tube adapted for connection to a source of air under controlled pressure, means connected to the upper end of said tube and adapted for connection to a gauging head, an indicating float arranged for movement along the passage of the transparent flow tube responsive to the velocity of air flow up the flow tube, strip means extending along the flow tube having vertically spaced calibrations thereon, said means providing a semi-cylindrical translucent portion extending closely along and behind said flow tube generally concentrically therewith and a portion along the tube generally radially thereof, a tubular light source extending vertically along and behind said translucent portion and parallel to said flow tube, means supporting the instrument components including attachment means engaging the strip means only adjacent the upper and lower ends thereof forming the sole support therefor; the flow tube, translucent portion, and the tubular light source being relatively spaced in that order away from the observer whereby direct illumination from said light source is diffused and illuminates the flow tube without strain on the observer's eyes; and a housing having an opening along the forward face thereof through which the flow tube and float are visible with the float silhouetted by light through the translucent portion in its position along the flow tube.

5. A precision gauging instrument for use in determining product characteristics by measuring air flow through a gauging head, said instrument comprising: a vertically disposed transparent flow tube having an internal passage tapering towards the lower end of the tube, means connected to the lower end of said tube adapted for connection to a source of air under controlled pressure, means connected to the upper end of said tube and adapted for connection to a gauging head, an opaque float arranged for movement along the passage of the transparent flow tube responsive to the velocity of air flow up the flow tube, said float having a flat upper indicating edge, a plastic scale strip having a translucent semi-cylindrical portion extending vertically along and behind said flow tube, said strip having vertically spaced horizontal opaque calibration lines behind said flow tube and therealong, a scale plate mounted on said plastic strip and lying in a plane diametral to the flow tube with one extended edge closely adjacent the flow tube, a tubular light source having a length commensurate with that of the flow tube mounted in said instrument extending vertically along and behind said plastic scale and parallel to said flow tube; the flow tube, the central portion of the plastic strip, and the tubular light source being relatively spaced in that order away from the observer whereby direct illumination from said light source is diffused and illuminates the flow tube without strain on the observer's eyes; and means supporting the instrument components and including a housing having an opening along the forward face thereof through which said flow tube, float and scale are visible with the float and scale calibrations in relatively silhouetted relationship.

6. A precision gauging instrument for use in determining product characteristics by measuring air flow through a gauging head, said instrument comprising: a vertically disposed transparent flow tube having an internal passage tapering toward the lower end of the tube, means connected to the lower end of said tube adapted for connection to a source of air under controlled pressure, means connected to the upper end of said tube and adapted for connection to a gauging head, an opaque float arranged for movement along the passage of the transparent flow tube responsive to the velocity of air flow up the flow tube, scale strip means extending along the flow tube having vertically spaced calibration lines thereon and providing a translucent semi-cylindrical portion, means removably mounting said strip means on said base with said semi-cylindrical portion extending closely along and behind said flow tube, an instrument housing having an opening along the forward face thereof through which said flow tube, float and scale are visible, said cabinet comprising an elongated removable back plate, a tubular light source, means mounting said tubular light source from said back plate in a vertical position along and behind said plastic scale and parallel to said flow tube, an electrical circuit for said tubular light source comprising electrical components and a switch, and means mounting said electrical components and said switch on said back plate, whereby the entire electrical assembly is readily removable as a unit from the gauging instrument, a base, and means supporting all other instrument components from said base independent of said back plate.

7. A precision gauging instrument for use in determining product characteristics by measuring air flow through a gauging head, said instrument comprising: a base, a vertically disposed transparent flow tube having an internal passage tapering toward the lower end of the tube, means mounting said tube from said base, means connected to the lower end of said tube adapted for connection to a source of air under controlled pressure, means connected to the upper end of said tube and adapted for connection to a gauging head, an opaque float arranged for movement along the passage of the transparent flow tube responsive to the velocity of air flow up the flow tube, a translucent scale strip carried from said base extending vertically along and behind said flow tube and having transverse opaque calibrations therealong, an instrument cabinet means mounted on said base and having an opening along the forward face thereof through which the flow tube, float and scale are visible, said cabinet means comprising a vertically disposed elongated back plate, means for removably mounting said back plate in said cabinet, a tubular light source, a first bracket fixed to said back plate adjacent its upper end and extending forwardly and supporting the upper end of the tubular light source, a second bracket fixed to said back plate adjacent its lower end and extending forward and supporting the lower end of the tubular light source, the bracket means cooperating to mount the tubular light source vertically along and behind said plastic scale and parallel to said flow tube, an electrical system for said tubular light source comprising electrical components and a switch, and means mounting said electrical components and said switch from said removable back plate, whereby the entire electrical assembly is carried with the back plate upon its removal from the gauging instrument.

References Cited in the file of this patent

UNITED STATES PATENTS

| | | |
|---|---|---|
| 2,246,464 | Gerber | June 17, 1941 |
| 2,593,957 | Aller | Apr. 22, 1952 |
| 2,655,045 | Hart et al. | Oct. 13, 1953 |